United States Patent [19]
Ohta et al.

[11] Patent Number: 6,137,947
[45] Date of Patent: Oct. 24, 2000

[54] METHOD AND APPARATUS FOR REPRODUCING A VIDEO SIGNAL

[75] Inventors: Masashi Ohta, Tokyo; Toshiya Akiba; Naohisa Arai, both of Kanagawa; Masami Tomita, Chiba, all of Japan

[73] Assignee: Sony Corporation, Tokyo, Japan

[21] Appl. No.: 09/034,937

[22] Filed: Mar. 4, 1998

[30] Foreign Application Priority Data

Mar. 10, 1997 [JP] Japan ..................................... 9-055105

[51] Int. Cl.$^7$ ................................................. H04N 5/783
[52] U.S. Cl. ............................................. 386/68; 386/112
[58] Field of Search ................................. 386/46, 52, 95, 386/68, 81, 111, 112; H04N 5/783

[56] References Cited

U.S. PATENT DOCUMENTS 5,960,148  9/1999  Miyazawa ................................. 386/52
5,987,212  11/1999  Kim et al. ................................. 386/68

Primary Examiner—Huy Nguyen
Attorney, Agent, or Firm—Frommer Lawrence & Haug, LLP.; William S. Frommer; Dexter T. Chang

[57] ABSTRACT

A video signal reproducing method and apparatus are arranged to improve a retrieval characteristic and alleviate fatigue and discomfort of a user at a fast reproduction mode and further magnify the reproduction speed more. In the video signal reproducing apparatus, a fast reproducing circuit 15 synthesizes the picture data written in memories 21 and 22 for generating data of a middle picture in the case of outputting the picture data of one screen written in the memories 21 and 22. Then, the circuit 15 inserts the data of the middle picture between the picture data for generating the output picture at a fast reproduction speed. The data of the middle picture is generated by adding the picture data of both memories at a ratio set by a main control unit. This ratio is a coefficient K ($0 \leq K \leq 1$) and is given as a value of (1−K) to a first multiplier 25, while it is given as a value of K to a second multiplier 26. The value of (1−K) is multiplied by the picture data of each memory by the first multiplier. The value of K is multiplied by the picture data of each memory by the second multiplier. The results of the multipliers are added by the adder 27. Then, the added result is fed out of the reproducing apparatus.

17 Claims, 10 Drawing Sheets

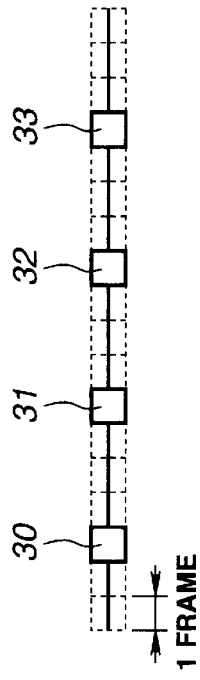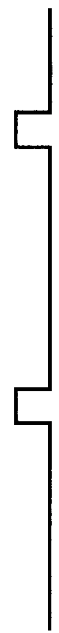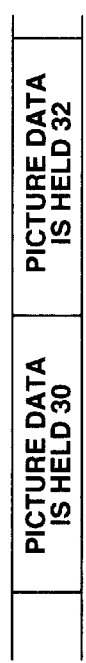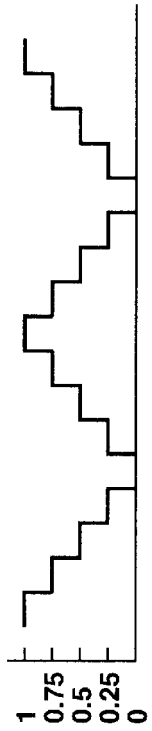
FIG.5A  INPUT PICTURE
FIG.5B  WRITE OF FIRST MEMORY 21
FIG.5C  WRITE OF SECOND MEMORY 21
FIG.5D  DATA OF FIRST MEMORY 21
FIG.5E  DATA OF FIRST MEMORY 22
FIG.5F  SYNTHESIZING RATIO K (COEFFICIENT)
FIG.5G  SYNTHESIZED PICTURE

METHOD AND APPARATUS FOR REPRODUCING A VIDEO SIGNAL

BACKGROUND OF THE INVENTION

1. Field of the Invention

The present invention relates to a method and an apparatus for reproducing a video signal, and more particularly to the method for reproducing a video signal which is suitable for special reproduction speed and the apparatus for reproducing a video signal which is implemented on the method.

2. Description of the Related Art

In general, a video signal reproducing apparatus that is arranged to read an analog or digital signal from an optical disk or a harddisk and reproduce it as a video signal or an audio signal has employed the method for sequentially outputting still images at fixed intervals and reproducing the signal according to a selected reproduction speed magnification if the apparatus is set to reproduce the signal at a fast speed such as a double speed or a triple speed. This reproducing method is used for a video signal reproducing apparatus such as a laser disk player. Concretely, the method is executed to reproduce intermittent pictures by a seeking operation for moving a light pickup in the radial direction of the optical disk. In some magnifications of the fast reproduction, the method is executed to output the same video signal as a still picture over several frames while the light pickup is moving.

If the reproduction speed is twice or three times as fast as the normal speed, this type or reproduction method does not bring about any problem as long as the serially reproduced images are correlated with each other. However, if the reproduction speed is several tens times as fast as the normal speed, the conventional reproduction method is executed to sequentially reproduce the pictures the adjacents of which are not so much correlated with each other, because the fast reproduction speed enlarges the interval of the selected frames. This method thus has difficulty in recognizing each picture, so that it may lose the easiness of retrieval.

Moreover, this type of reproduction method continuously brings about abrupt change of the reproduced pictures, which gives stress to a human visual sense and thus is not suitable to continuous or long-time use. Hence, this type of reproduction method cannot enhance the magnification of fast reproduction further.

SUMMARY OF THE INVENTION

The present invention is proposed for solving the foregoing problem, and it is an object of the present invention to provide a method and an apparatus for reproducing a video signal which are arranged to improve retrieval and reduce fatigue and discomfort in reproducing a signal at fast speed so that they may enhance the magnification of fast reproduction further.

According to an aspect of the invention, an apparatus for reproducing a video signal includes: means for reading a video signal out of a recording medium according to a reproduction speed; means for generating a frame from the read video signal; means for synthesizing the adjacent two frames of a series of frames to be generated at a given ratio; and means for inserting the synthesized frame between the two adjacent frames.

According to another aspect of the invention, a method for reproducing a video signal includes the steps of: reading out a video signal from a recording medium according to a reproduction speed; generating a frame from the read video signal; synthesizing two adjacent frames of a series of frames to be generated at a given ratio; and changing a reproduction speed by inserting a frame of the synthesizing video signal between the two frames.

Further objects and advantages of the present invention will be apparent from the following description of the preferred embodiments of the invention as illustrated in the accompanying drawings.

BRIEF DESCRIPTION OF THE DRAWINGS

FIG. 5 is an explanatory view showing an example of a method for creating a picture;

DESCRIPTION OF THE PREFERRED EMBODIMENTS

Figure 1:
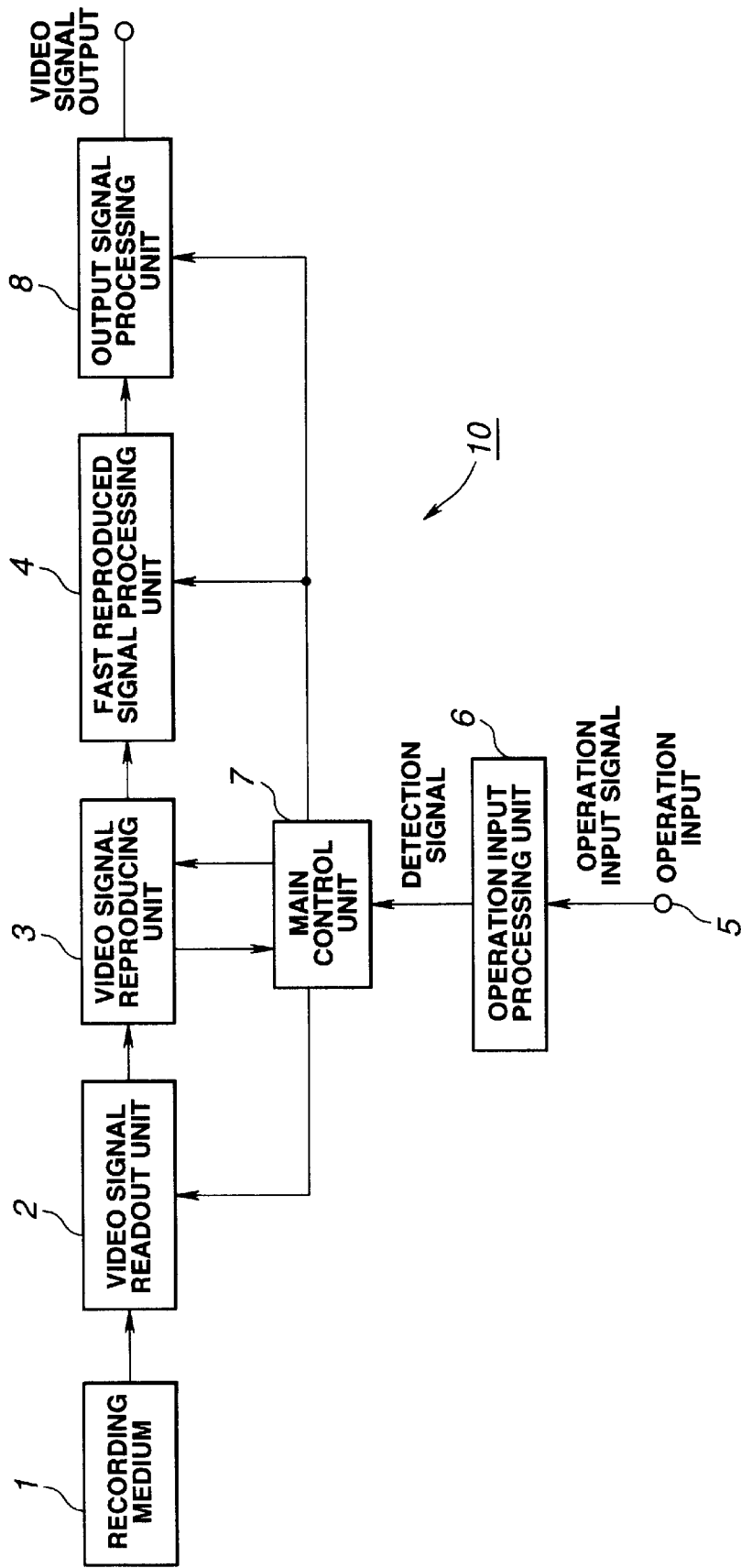
FIG. 1 is a block diagram showing an arrangement of an apparatus for reproducing a video signal according to a first embodiment of the present invention.

Hereafter, the description will be oriented to the embodiments of the present invention with reference to the appended drawings. FIG. 1 illustrates a video signal reproducing apparatus 10 according to a first embodiment of the invention. The video signal reproducing apparatus 10, as shown in FIG. 1, includes a video signal readout unit 2, a video signal reproducing unit 3, a fast reproduced signal processing unit 4, an operation input signal processing unit 6, a main control unit 7, and an output signal processing unit 8. This video signal reproducing apparatus 10 is operated in response to the operational input entered by a remote controller 5.

The video signal readout unit 2 operates to read out a video signal from a recording medium 1 based on a control signal given from the main control unit 7 (to be discussed below) and feed the video signal to the video signal reproducing unit 3. This video signal readout unit 2 is composed of a light pickup, for example. As will be described below, the unit 2 operates to read out a video signal from the recording medium 1 at the corresponding intervals to the reproduction magnification selected by the remote controller 5. The video signal readout unit 2 operates to intermittently read out the video signal from the recording medium 1, because it thins the pictures out of the video signal of the normal reproduction when the apparatus 10 is set to a fast reproduction mode.

The recording medium 1 is an optical disk, a magneto-optical disk or the like. The recording medium 1 contains the video signal and its relevant additional information recorded thereon. The details of the relevant additional information will be described below.

The video signal reproducing unit 3 operates to reproduce a video signal from the signal read out of the video signal readout unit 2. If the data is recorded as analog data on the recording medium 1, the video signal reproducing unit 3 operates to convert the analog signal into a digital signal. If the recorded data is error-corrected or compressed, the unit 3 operates to decode the data in the corresponding manner. The video signal reproducing unit 3 operates to supply the reproduced digital video signal to the fast reproduced signal processing unit 4.

The fast reproduced processing unit 4 operates to convert the digital video signal reproduced by the unit 3 into the signal suited to the reproduction speed. This conversion is executed on the control signal sent from the main control unit 7 (to be discussed below). The signal converted by the fast reproduced signal processing unit 4 is supplied to the output signal processing unit 8 in the format of the digital video signal.

The remote controller 5 operates to issue various kinds of operation instructions to the video signal reproducing apparatus 10. For example, the remote controller 5 outputs instruction signals such as an ON/OFF signal of an overall power supply of the apparatus 10, a reproduction/stop signal of the video signal, a fast reproduction/slow reproduction/temporary stop signal in reproducing the video signal, and a set/change signal of a reproduction speed in the fast reproduction. The operation signals inputted from the remote controller 5 are inputted into the operation input processing unit 6.

The operation input processing unit 6 receives the operation input signal from the remote controller 5, detects the type of instruction, and supply the detection signal to the main control unit 7.

The main control unit 7 operates to control the video signal readout unit 2, the video signal reproducing unit 3, and the fast reproduced signal processing unit 4 based on the detection signal sent from the operation input processing unit 6. The main control unit 7 operates to detect a synchronous signal from the video signal reproducing unit 3, generate clocks from this synchronous signal, and supply the clocks to the video signal reproducing unit 3, the fast reproduced signal processing unit 4 and the output signal processing unit 8.

The output signal processing unit 8 performs a digital-to-analog conversion or an amplification with respect to the output signal so that the digital video signal is allowed to be reproduced on a monitor. Hence, the output from this output signal processing unit 8 is connected to the monitor or the like. Then, the video signal can be displayed on the monitor at various reproduction modes.

Figure 2:
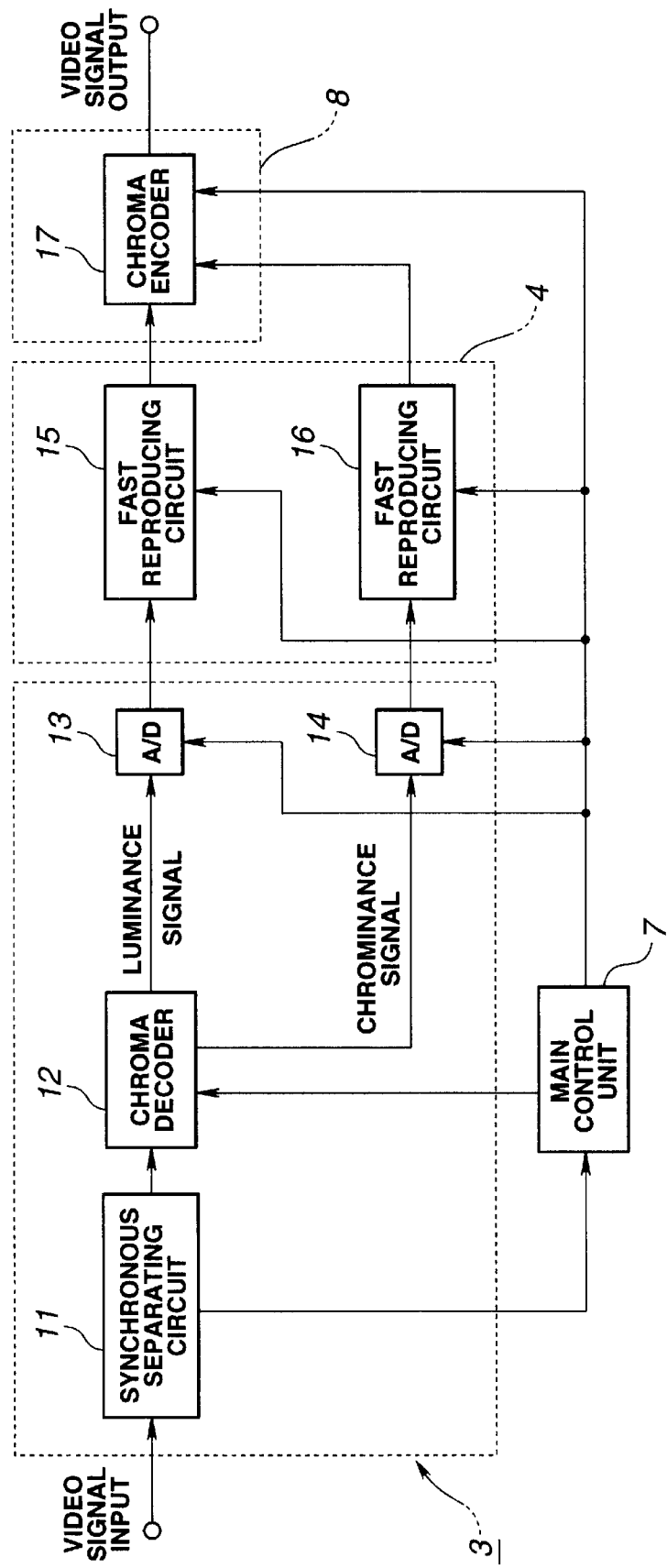
FIG. 2 is a circuit diagram mainly showing an arrangement of a video signal reproducing unit of the apparatus shown in FIG. 1.

FIG. 2 shows an arrangement of the video signal reproducing unit 3, the fast reproduced signal processing unit 4, and the output signal processing unit 8. In FIG. 2, the video signal sent from the video signal readout unit 2 is an analog composite video signal composed of a luminance signal, a chrominance signal, and a synchronous signal. This arrangement is intended for processing this composite video signal. The video signal reproducing unit 3 is composed of a synchronous separating circuit 11, a chroma decoder 12, a first analog-to-digital (A/D) converter 13, and a second analog-to-digital (A/D) converter 14.

The fast reproduced signal processing unit 4 is composed of a first fast reproducing circuit 15 and a second fast reproducing circuit 16. The output signal processing unit 8 provides a chroma encoder 17.

The synchronous separating circuit 11 is inputted with a composite video signal supplied from the video signal readout unit 2 and operates to separate the composite video signal into a synchronous signal and a video signal (luminance signal and chrominance signal). The synchronous separating circuit 11 operates to supply this synchronous signal to the main control unit 7 and the video signal to the chroma decoder 12.

The main control unit 7 operates to generate clocks from this synchronous signal and supply the generated clocks to the video signal reproducing unit 3, the fast reproduced signal processing unit 4, and the output signal processing unit 8.

The chroma decoder 12 operates to separate the input video signal into the luminance signal and the chrominance signal. The chroma decoder 12 operates to supply the separated luminance signal to the first A/D converter 13 and the separated chrominance signal to the second A/D converter 14.

The first A/D converter 13 operates to convert the input luminance signal into a digital signal and then supply the digital signal to the first fast reproducing circuit 15. Likewise, the second A/D converter 14 operates to convert the input chrominance signal into the digital signal and then supply it to the second fast reproducing circuit 16.

The fast reproducing circuits 15 and 16 provided in the fast reproduced signal processing unit 4 perform the necessary processes to the reproduction speed selected by the remote controller 5 and then supply the processed signal to the chroma encoder 17.

The chroma encoder 17 operates to synthesize the signal processed by the fast reproducing circuit 15 with the signal processed by the fast reproducing circuit 16 and perform a digital-to-analog conversion with respect to the synthesized signal for generating the final video signal to be outputted from the apparatus 11.

Figure 3:
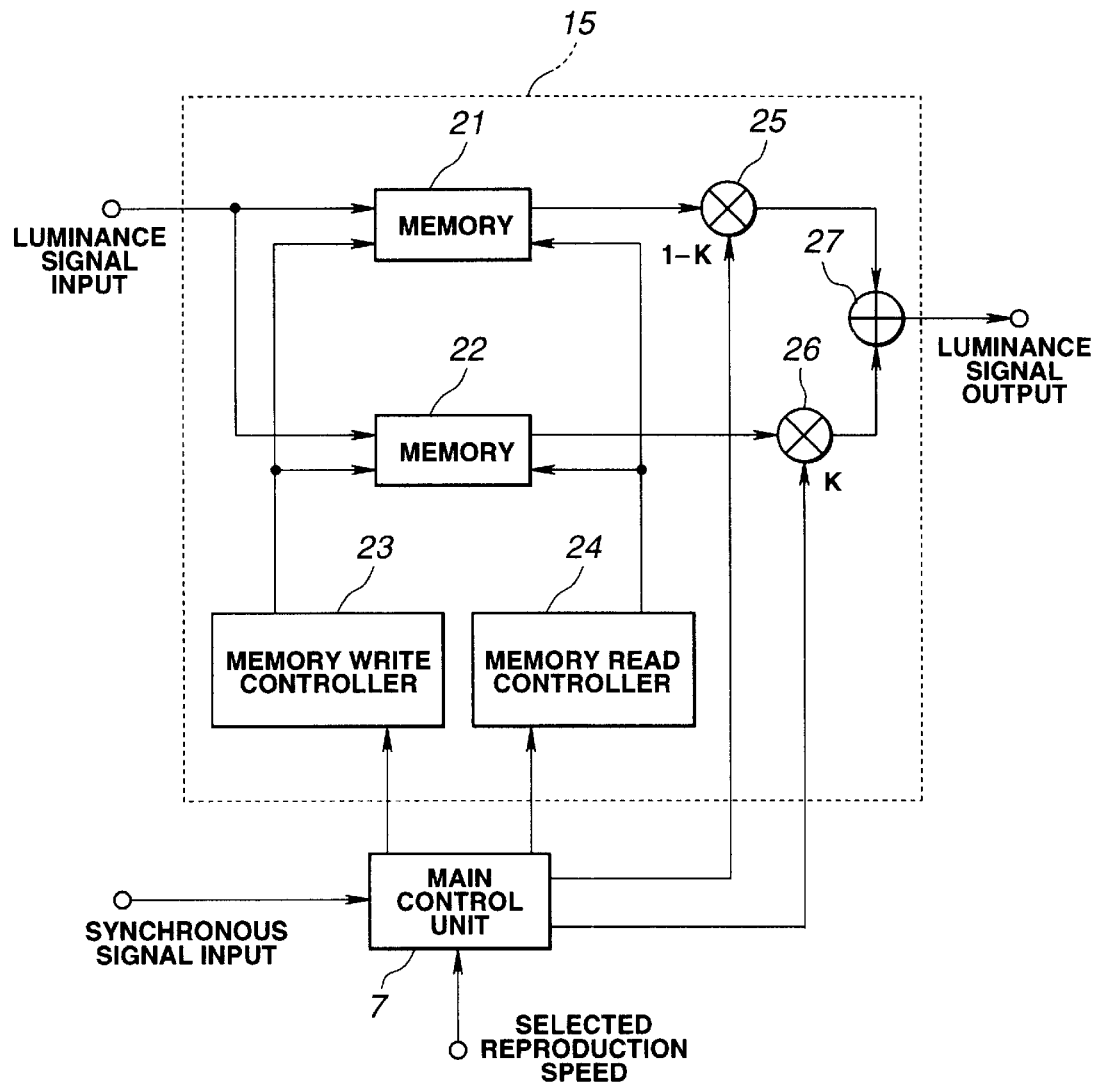
FIG. 3 is a circuit diagram showing an arrangement of a fast signal reproducing circuit of the apparatus shown in FIG. 1.

In turn, the description will be oriented to the arrangement of the fast reproducing circuit located in the fast reproduced signal processing unit 4 with reference to FIG. 3. The first fast reproducing circuit 15 has the same arrangement as the second fast reproducing circuit 16. Later, the description is oriented to the first fast reproducing circuit 15 only. The description about the second fast reproducing circuit 16 is left out.

As shown in FIG. 3, the fast reproducing circuit 15 is composed of a first memory 21, a second memory 22, a memory write controller 23, a memory read controller 24, a first multiplier 25, a second multiplier 26, and an adder 27.

This fast reproducing circuit 15 is a circuit for synthesizing a middle picture from the previous and the subsequent pictures and inserting it when the picture is switched at the fast reproduction mode. Then, in response to the control given by the main control unit 7, the fast reproducing circuit 15 enables to change an interval between the pictures used for the display, a variation of a synthesizing ratio when generating the middle picture to be inserted, and an inserting ratio of the generated middle image according to the reproduction magnification and the movement of the picture.

The first and the second memories 21 and 22 are respectively written with a luminance signal of one picture (referred to as picture data) converted into a digital signal by the first A/D converter 13 of the video signal reproducing unit 3 in response to the control signal sent from the memory write controller 23 (to be discussed below). The first and the second memories 21 and 22 are operated to read out the written picture data in response to the control signal given from the memory read controller 24 (to be discussed below).

The memory write controller 23 operates to control the write of the picture data into the memories 21 and 22 at the set intervals. On the other hand, the memory read controller 24 operates to control the read of the written picture data from the memories 21 and 22. These memory write controller 23 and memory read controller 24 are controlled on the control signal sent from the main control unit 7.

The first multiplier 25 operates to multiply a coefficient (1−K) (the detail of which will be described below) outputted from the main control unit 7 by the picture data from the first memory 21 and then supply the multiplied signal to the adder 27. The second multiplier 26 operates to multiply a coefficient K (the detail of which will be described below) outputted from the main control unit 7 by the output from the second memory 22 and supply the multiplied signal to the adder 27. The adder 27 operates to add the signals supplied from the multipliers 25 and 26 to each other and then output the added signal to the output signal processing unit 8.

Later, the description will be oriented to the operation of the fast reproducing circuit 15 in the case of reproducing a video signal at a faster speed than a normal speed in the video signal reproducing apparatus 10. The reproduction speed is specified by the input given by the remote controller 5. In the video signal reproducing apparatus 10, the operation input processing unit 6 operates to detect a type of an operation input and the main control unit 7 operates to control the fast reproduced signal processing circuit 15 in response to the input.

The main control unit 7 operates to set the writing timing of the input video signal onto the first and the second memories 21 and 22 according to the specified reproduction speed. Further, the main control unit 7 determines the method of generating the output picture according to the specified reproducing speed. That is, at the fast reproduction, as will be discussed below, the main control unit 7 operates to control the video signal readout unit 2 to reproduce the pictures skipped at given intervals. By intermittently reading out the video signal from the recording medium 1, it is possible to use the pictures thinned out of the picture signal at the normal reproduction. Hence, the main control unit 7 operates to supply the data about the writing timing of the used pictures onto the memories 21 and 22 to the memory write controller 23. The memory write controller 23 operates to control the write of the picture data onto the memories 21 and 22 based on this data sent from the main control unit 7 in a manner that the picture data is written alternately onto the memories 21 and 22.

Further, the main control unit 7 determines the method for outputting the video signal according to the set reproduction speed. That is, the main control unit 7 utilizes the picture synthesized from the picture data written on the memories 21 and 22 when reproducing the video signal. Hence, the main control unit 7 operates to supply the data about the method for generating the output picture to the memory read controller 24. The memory read controller 24 operates to read the picture data written on the memories 21 and 22 based on the data sent from the main control unit 7 and output the picture data onto the multipliers 25 and 26.

The fast reproducing circuit 15 operates to synthesize the picture data written on these two memories 21 and 22 into the middle picture data when the memories 21 and 22 output the corresponding picture data of one picture. Then, the circuit 15 operates to insert the middle picture data into between the picture data for generating the output picture at the fast reproduction mode.

The middle picture data is generated by adding the picture data from the memories to each other at a ratio properly set by the main control unit 7. The ratio set by the main control unit 7 is supplied as a coefficient K ($0 \leq K \leq 1$) to the first and the second multipliers 25 and 26. The first multiplier 25 is inputted with the coefficient (1−K) and the second multiplier 26 is inputted with the coefficient K. Then, the multipliers 25 and 26 operate to multiply the corresponding coefficients by the picture data read out of the memories 21 and 22. The multiplied results from the multipliers 25 and 26 are added by the adder 27 and then sent to the output signal processing unit 8.

The main control unit 7 operates to determine and adjust the number of the middle pictures to be synthesized and inserted at the specified reproduction speed and the synthesizing ratio of the middle pictures based on the inserting location, that is, the inserting timing. In some reproduction speeds, the picture data written on the memories 21 and 22 are directly outputted as the still picture. In this case, the main control unit 7 operates to determine and adjust only the number of pages to be outputted.

Figure 4:
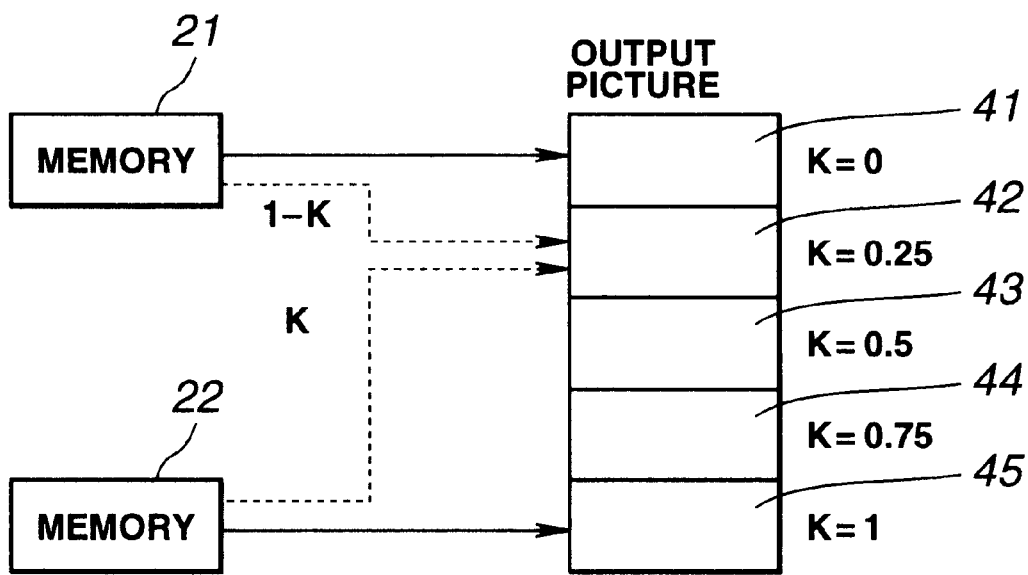
FIG. 4 is an explanatory view showing pictures outputted from the apparatus shown in FIG. 1.

FIG. 4 shows the synthesis of picture data at the fast reproduction mode. The memories 21 and 22 contain the picture data written thereon. The picture data of the memory 21 is spaced from but is not correlated with that of the memory 22. In the synthesis shown in FIG. 4, the picture data of the memory 21 is made to be the output picture 41 and the picture data of the memory 22 is made to be the output picture 45. Three middle pictures 42, 43 and 44 are inserted between the output picture 41 and the output picture 45.

As stated above, the coefficient K is a value for indicating a synthesizing ratio of the pictures determined by the main control unit 7 according to the reproduction speed. Herein, the value of K is linearly changed from 0 to 1 according to the inserting timing. The value of K at the first insertion is 0.25. The value of K at the second insertion is 0.5. The value of K at the third insertion is 0.75. Hence, at the first insertion, a value of (1−K)=0.75 is multiplied by the picture data of the first memory 21 and a value of K=0.25 is multiplied by the picture data of the second memory 22. The two pieces of multiplied picture data are added by the adder 27 for generating the middle picture 42. Later, the similar process is executed along the value of K for generating the middle pictures 43 and 44. These middle pictures 42 to 44 are inserted between the output pictures 41 and 45.

In the synthesis of the next picture, by rewriting the picture data written in the first memory 21 while the picture data is held in the second memory 22, the process is executed for replacing the corresponding synthesizing ratio to the first memory 21 with the corresponding synthesizing ratio to the second memory 22. This process is concretely shown in FIG. 5. Hereafter, the description will be expanded with reference to FIG. 5. In this process, the pictures are treated at a frame unit. As shown in FIG. 5A, at the fast reproduction mode, the video signal readout unit 2 operates to input the picture data 30, 31, 32, 33, . . . of one screen at a period of four frames.

In the fast reproduction, the video signal readout unit 2 shown in FIG. 1 operates to read a video signal of one screen from the recording medium 1 at each frame corresponding to the reproducing magnification of the video signal. Then, the video signal is converted into the digital picture data by the video signal reproducing unit 3. The picture data is inputted into the fast reproducing circuit 15 shown in FIG. 3 (This picture data will be referred to as input picture data). The input picture data is written alternately in the memories 21 and 22.

In this illustrative process, the memory write controller 23 operates to control the write of each input picture data in the first memory 21 on the writing timing shown in FIG. 5B and the writing timing of the second memory 22 shown in FIG. 5C. Concretely, the memory write controller 23 operates to control the write of the input picture data 30 in the first memory 21 on the predetermined timing shown in FIG. 5B and the write of the input picture data 31 in the second memory 22 on the predetermined timing shown in FIG. 5C.

Further, the memory write controller 23 operates to control the write of the input picture data 32 in the first memory 21 and the write of the input picture data 33 in the second memory 22. Likewise, the input picture data is written alternately in the memories 21 and 22 at each period of four frames. In the memories 21 and 22, as shown in FIGS. 5D and 5E, the written input picture data is held as it is for an interval of eight frames from the write of the next picture data to the rewrite of the data in the memory.

The output picture is determined by setting a value of the coefficient K to be inputted to the multipliers 25 and 26. The coefficient K is a synthesizing ratio of the picture data held in the memories. As shown in FIG. 5F, the value of the coefficient K is changed at each frame by the main control unit 7.

For example, the output picture 41 shown in FIG. 5G corresponds to the picture given in the case of K=0 shown in FIG. 5F, in which case the inserting ratio of the picture data held in the second memory 22 is 0 while the inserting ratio of the picture data 30 held in the first memory 21 is (1−K)=1. At this time, the memory read controller 24 operates to control the read of the data only from the first memory 21. By this operation, the adder 27 is served to output only the picture data 30 written in the first memory 21. Hence, the output picture 41 is made to be the picture composed only on the picture data 30.

The next output picture 42 shown in FIG. 5G is composed by multiplying the coefficient K=0.25 shown in FIG. 5F by the input picture data, in which the inserting ratio of the picture data 31 held in the second memory 22 is 0.25, while the inserting ratio of the picture data 30 held in the first memory 21 is (1−K)=0.75. In this case, the memory read controller 24 operates to control the read of the data from the first and the second memories 21 and 22. The output picture 42 is made to be a sum of the picture data 30 of the first memory 21 multiplied by the coefficient of 0.75 by the multiplier 25 and the picture data 31 of the memory B multiplied by the coefficient of 0.25 by the multiplier 26. As a result, the output picture 42 is made to be the middle picture composed by synthesizing the picture data 30 with the picture data 31 at a ratio of 1:3. Then, the similar process is executed so that the next output pictures 43 and 44 are synthesized into the middle picture. Further, the output picture 45 is a result of multiplying the coefficient of K=1 by the input picture data.

In the video signal reproducing apparatus 10, the main control unit 7 operates to output the coefficient K according to the number of interpolations and the synthesizing ratio so that the output picture for the middle picture is generated from the picture data held in the memories 21 and 22. Hence, by inserting this picture, it is possible to gradually change the reproduced picture.

In the illustrative process, the number of the middle pictures to be inserted is three. In actual, however, the number of the middle pictures to be inserted may be properly changed according to the reproduction speed. This may be implemented without any change of the arrangement.

Figure 6A:
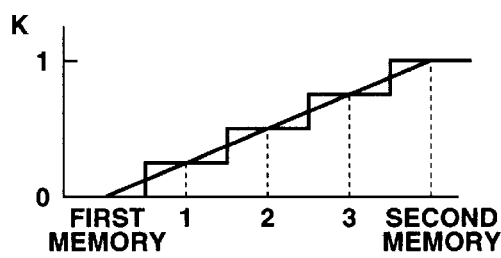
FIGS. 6A to 6D are graphs showing characteristics appearing in the case of controlling a variation of a coefficient.

For setting a variation of the coefficient K, it is possible to properly change it according to the reproduction speed. In the video signal reproducing apparatus 10, the main control unit 7 operates to control the variation of the coefficient K. This control will be shown in FIGS. 6A to 6D. In those graphs in which the axis of ordinance indicates the coefficient K, the graph shown in FIG. 6A indicates the interpolation of the middle pictures of three frames shown in FIGS. 4 and 5.

Figure 6B:
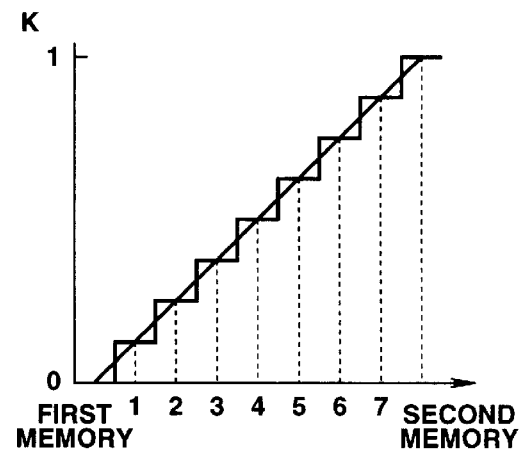

The graph shown in FIG. 6B indicates the interpolation of the middle pictures of seven frames. In the video signal reproducing apparatus 10, by increasing the number (times) of the middle pictures to be inserted with the increase of the reproducing speed, it is possible to smoothly change the reproduced picture, thereby alleviating the stress in retrieval and improving the retrieval characteristic. In the control of the coefficient K shown in FIGS. 6A and 6B, the value of the coefficient K is linearly changed according to the timing of the frames to be interpolated.

Figure 6C:
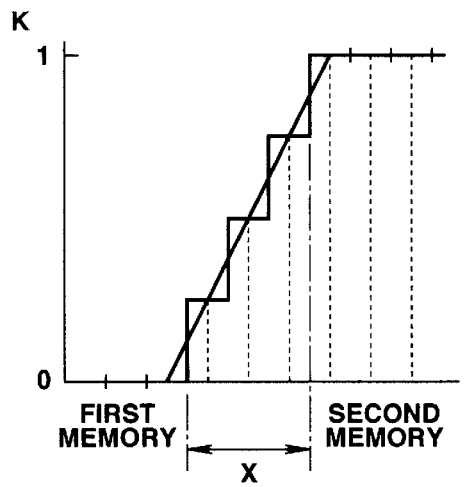
Figure 6D:
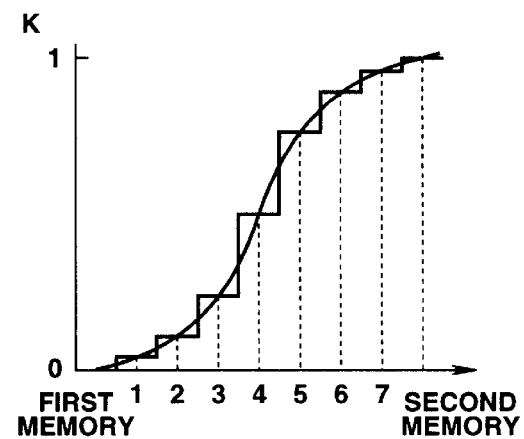

The graphs of FIGS. 6C and 6D are suitable to the far faster reproducing speeds. In comparison with the graph of FIG. 6D, the graph of FIG. 6C indicates the case that the value of the coefficient K is changed with respect to only the part of the frames to be interpolated, that is, the case the same picture is outputted with K=0 or K=1 over plural frames. The frames are synthesized only for an period of X indicated by an arrow. For the other periods, the previous and subsequent frames thereto are sequentially outputted for making a still picture.

The video signal reproducing apparatus 10 provides means for extending a display time of the still picture at a faster reproduction, so that a searcher may have a longer time for searching the pictures. Further, by inserting the middle pictures, it is possible to improve the retrieval by suppressing the abrupt change of the pictures. Further, the video signal reproducing apparatus 10 offers the similar effect to the case of FIG. 6C if the value of K is curvilinearly changed as shown by the graph of FIG. 6D.

Figure 7:
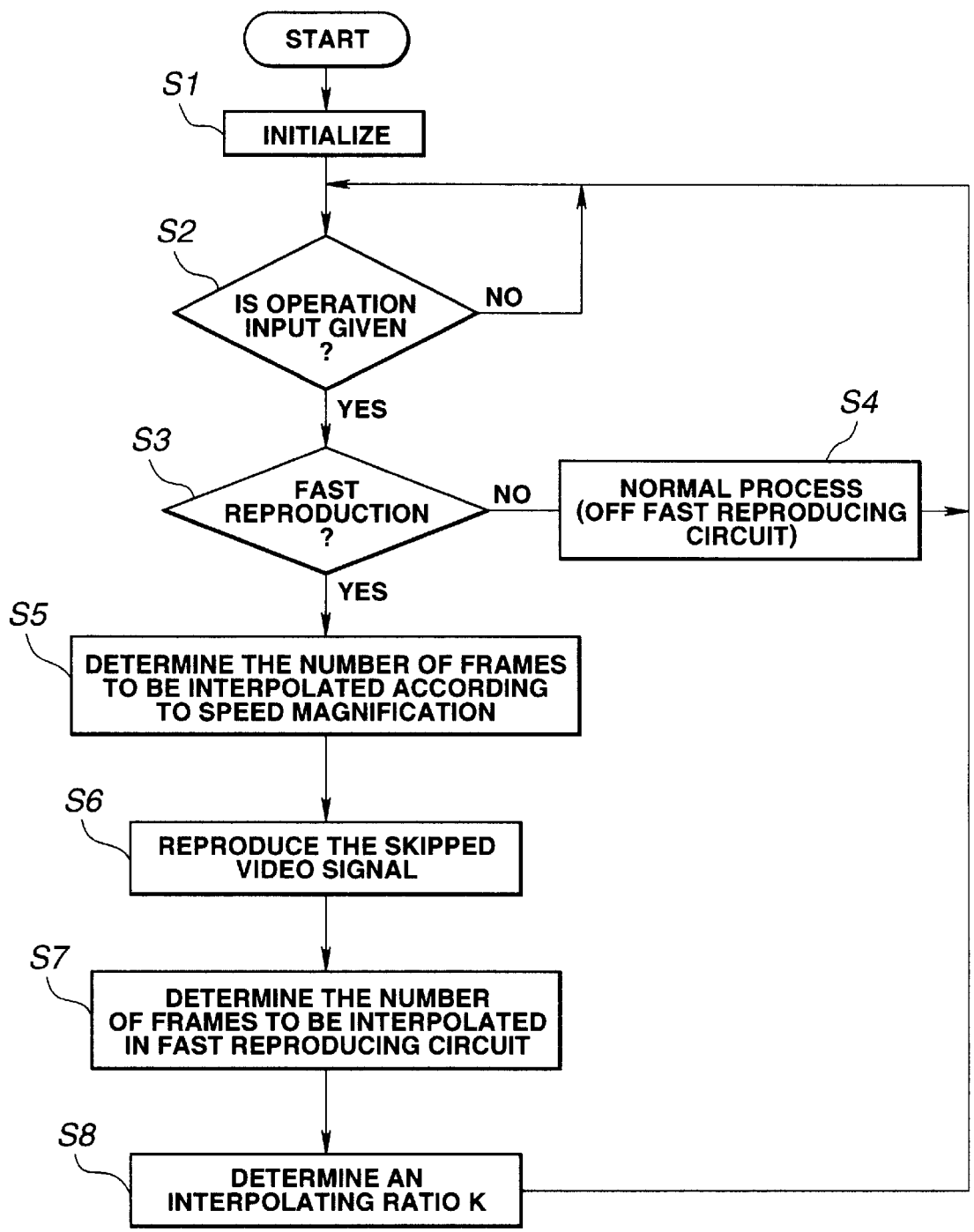
FIG. 7 is a flowchart showing a control operation of a main control unit.

Next, the operation of the main control unit 7 located in the video signal reproducing apparatus 10 will be described with reference to FIG. 7. At a step S1 after power-on, the main control unit 7 operates to initialize the video signal readout unit 2, the video signal reproducing unit 3, the fast reproduced signal processing unit 4 and so forth so that those blocks are put into the waiting state for the operation input. At the subsequent step S2, the main control unit 7 determines if the operation input is given and is waiting at the step S2 until the operation input is given. If it is given, the process goes to a step S3.

At this step S3, the main control unit 7 determines if this operation input is given for the fast reproduction. If it is not for the fast reproduction, the process goes to a step S4 at which the process for the normal reproduction is executed. This process means the reproduction except the fast one. In the normal process at the step S4, the foregoing generation of the middle pictures is not required. Hence, the main control unit 7 operates to turn off the fast reproducing circuits 15 and 16 if necessary and control the supply of the signal from the video signal reproducing unit 3 to the output signal processing unit 8 through the fast reproducing unit 4 without any change.

If the given operation is determined for the fast reproduction at the step S3, the process goes to a step S5 at which the main control unit 7 performs the following fast reproducing process by controlling the fast reproducing circuits 15 and 16 of the fast reproduced signal processing unit 4. At the step S5, the main control unit 7 operates to determine the number of frames to be interpolated as the middle pictures according to the reproduction magnification. Based on the determined number of frames, the video signal reproducing apparatus 10 operates to determine the reading interval at which the video signal readout unit 2 reads out the video signal recorded on the recording medium 1 according to the reproduction magnification selected by the remote controller 5. In the subsequent step S6, the main control unit 7 operates to control the video signal readout unit 2 to skip the pictures according to the determined interval when reproducing the picture data and read out the necessary video signal. At this step S6, the process is executed to sequentially read out the intermittent pictures.

The main control unit 7 operates to control the fast reproducing circuits 15 and 16 as mentioned above by determining the number of middle pictures to be interpolated by the fast reproducing circuits 15 and 16 at the step S7 and determining the coefficient K as the interpolating ratio at the next step S8

Upon the termination of controlling the fast reproducing circuits 15 and 16, the main control unit 7 goes back to the step S2 at which the similar process to the above is restarted.

Figure 8:
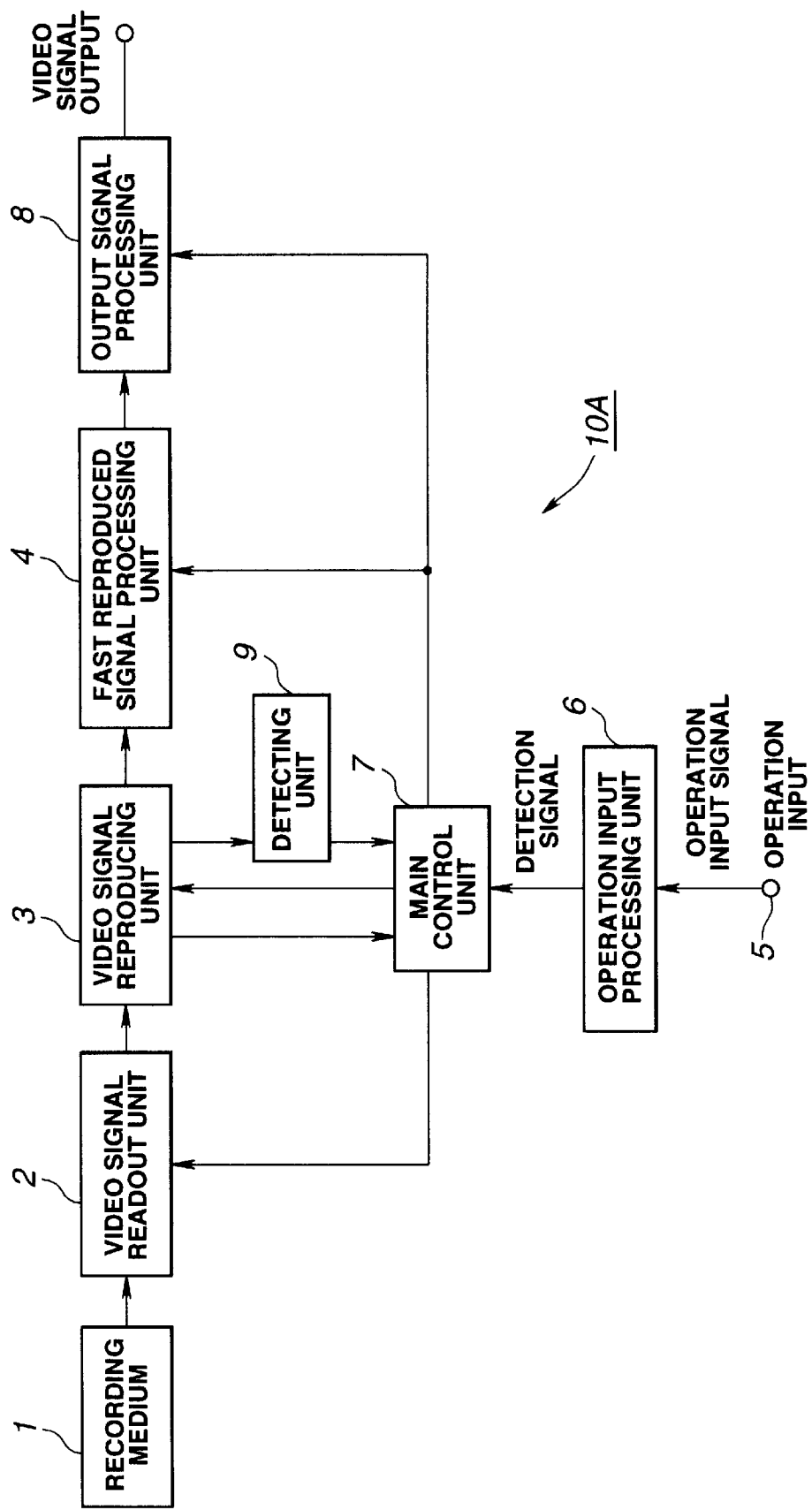
FIG. 8 is a block diagram showing an arrangement of an apparatus for reproducing a video signal according to a second embodiment of the present invention.

FIG. 8 shows a video signal reproducing apparatus according to a second embodiment of the invention. The video signal reproducing apparatus 10A has the same arrangement as the video signal reproducing apparatus shown in FIG. 1 except that a detecting unit 9 is connected between the video signal reproducing unit 3 and the main control unit 7.

The detecting unit 9 operates to detect a movement or a scene change point from the video signal when the video signal reproducing unit 3 reproduces the video signal. The detected result given by the detecting unit 9 is inputted as the detection signal into the main control unit 7. The detection signal is used for the control at the fast reproduction mode. When reproducing a video signal with a large movement at a fast speed, the correlation of the intermittent frames is further lowered than that given in reproducing the video signal with a small movement at a fast speed. Hence, the video signal reproducing apparatus 10A enables to do the control based on the detection given by the detecting unit 9 for executing a superior fast reproducing process.

For example, when the detecting unit 9 detects the still picture with no movement, it is not necessary to generate and insert the middle pictures as stated above at the fast reproduction mode. In such a case, therefore, the video signal reproducing apparatus 10A may just stop the fast reproducing process done by the fast reproducing circuits 15 and 16 of the fast reproducing unit 4.

When the detecting unit 9 detects the scene change point, the correlation between the previous and the subsequent pictures thereto is made lower. Hence, the video signal reproducing apparatus 10A enables to do the control based on the occurrence frequency of the scene changes. For example, for improving the retrieval characteristic, it is effective to display the picture where a scene change takes place. This control may be realized by using the detected result from the detecting unit 9.

Further, the smooth change of the screens with a more correlation is effective on the screen where the luminance and the contrast of the screen are high. Hence, the video signal reproducing apparatus 10A operates to detect these factors through the effect of the detecting unit 9 and control the reproducing interval according to the detected result.

Figure 9:
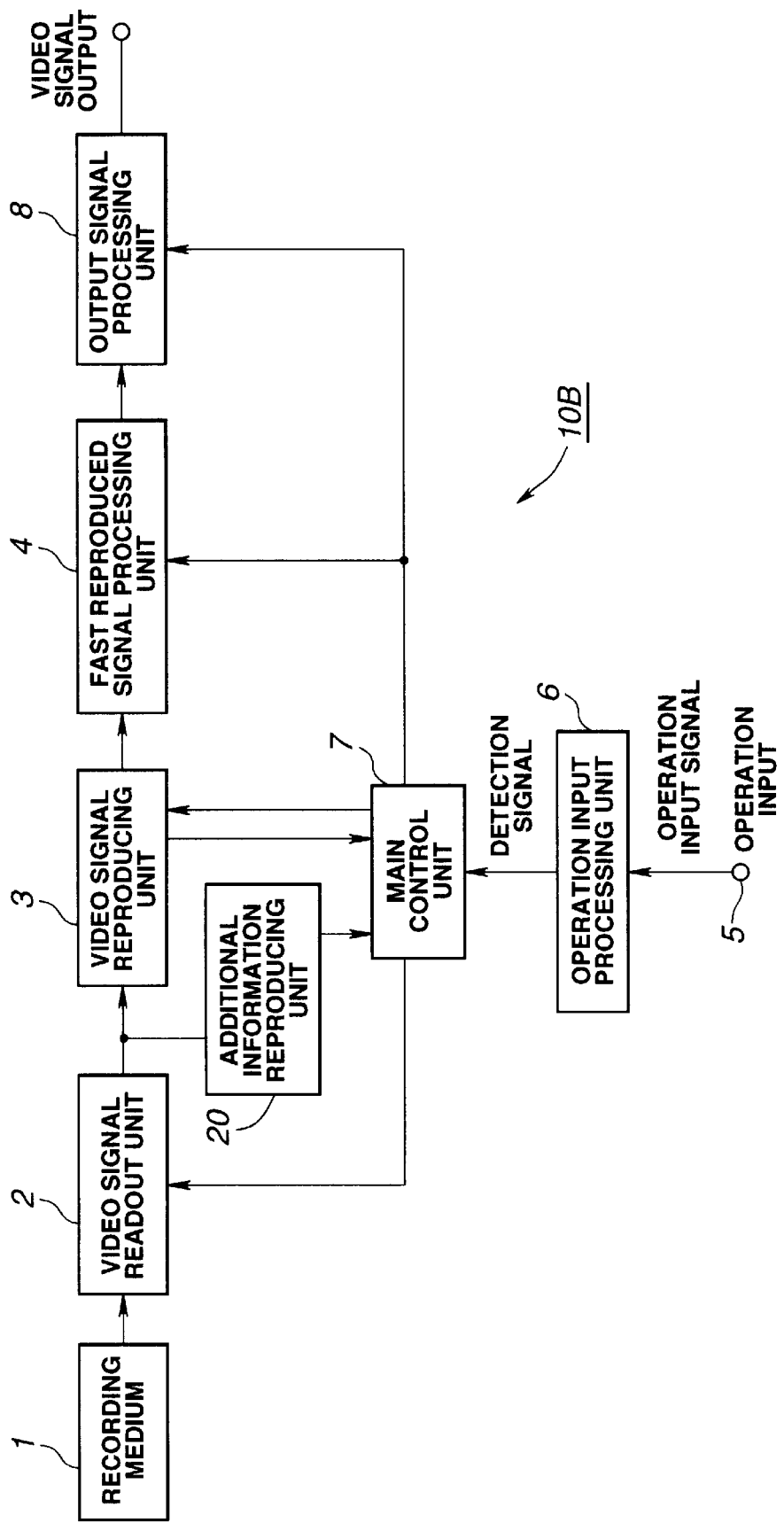
FIG. 9 is a block diagram showing an arrangement of an apparatus for reproducing a video signal according to a third embodiment of the present invention.

FIG. 9 shows a video signal reproducing apparatus according to a third embodiment of the invention. This video signal reproducing apparatus 10B has the same arrangement as the video signal reproducing apparatus 10 shown in FIG. 1 except that an additional information reproducing unit 20 is connected between the video signal readout unit 2 and the main control unit 7.

The additional information reproducing unit 20 operates to reproduce the additional information added to the video signal. The additional information reproduced by the additional information reproducing unit 20 is inputted into the main control unit 7. This information is used for the control at the fast reproduction mode. The additional information is the information added as the data except the picture when recording the video signal on the recording medium 1. Concretely, the additional information includes a content of a program, a genre of a program, presence or absence of text, presence or absence of music, and so forth. Further, the additional information reproducing unit 20 operates to reproduce as the additional information the information inserted in the vertical blanking interval except the picture data and the information overlapped with the video signal such as a pilot signal.

Hereafter, the description will be oriented to the control executed when the video signal reproducing apparatus 10B operates at a fast reproduction mode. For example, in general, a news program contains scenes with smaller movement and larger text than those of a sports program. Hence, in a case that the additional information indicating that the program is a news one is inputted to the main control unit 7 through the additional information reproducing unit 20, the main control unit 7 performs such a control as extending the reproduction of the portion of the still picture at the fast reproduction mode. Based on the control, the video signal reproducing apparatus 10B offers the effect that the text may be clearly read at the fast reproduction mode.

For the music program, the control at the fast reproduction mode is executed on the additional information for indicating if a piece of music is played. For example, by extending the reproduction of the start and the end of the music, it is possible to easily access the beginning of each piece of music without skipping the user's desirous music and achieve the easiness of retrieval of a music program at the fast reproduction mode.

Further, if the information such as the movement and the scene change point is recorded as the additional information in recording the picture, the video signal reproducing apparatus 10B enables to perform the similar control to the video signal reproducing apparatus 10A shown in FIG. 8 based on the reproduction of the video signal reproducing unit 3.

Further, it goes without saying that the video signal reproducing apparatus 10B is arranged to have the detecting unit 9 connected between the video signal reproducing unit 3 and the main control unit 7 and reflect the additional information reproduced by the additional information reproducing unit 20 on the motion detected by the detecting unit 9 when executing the control.

Figure 10:
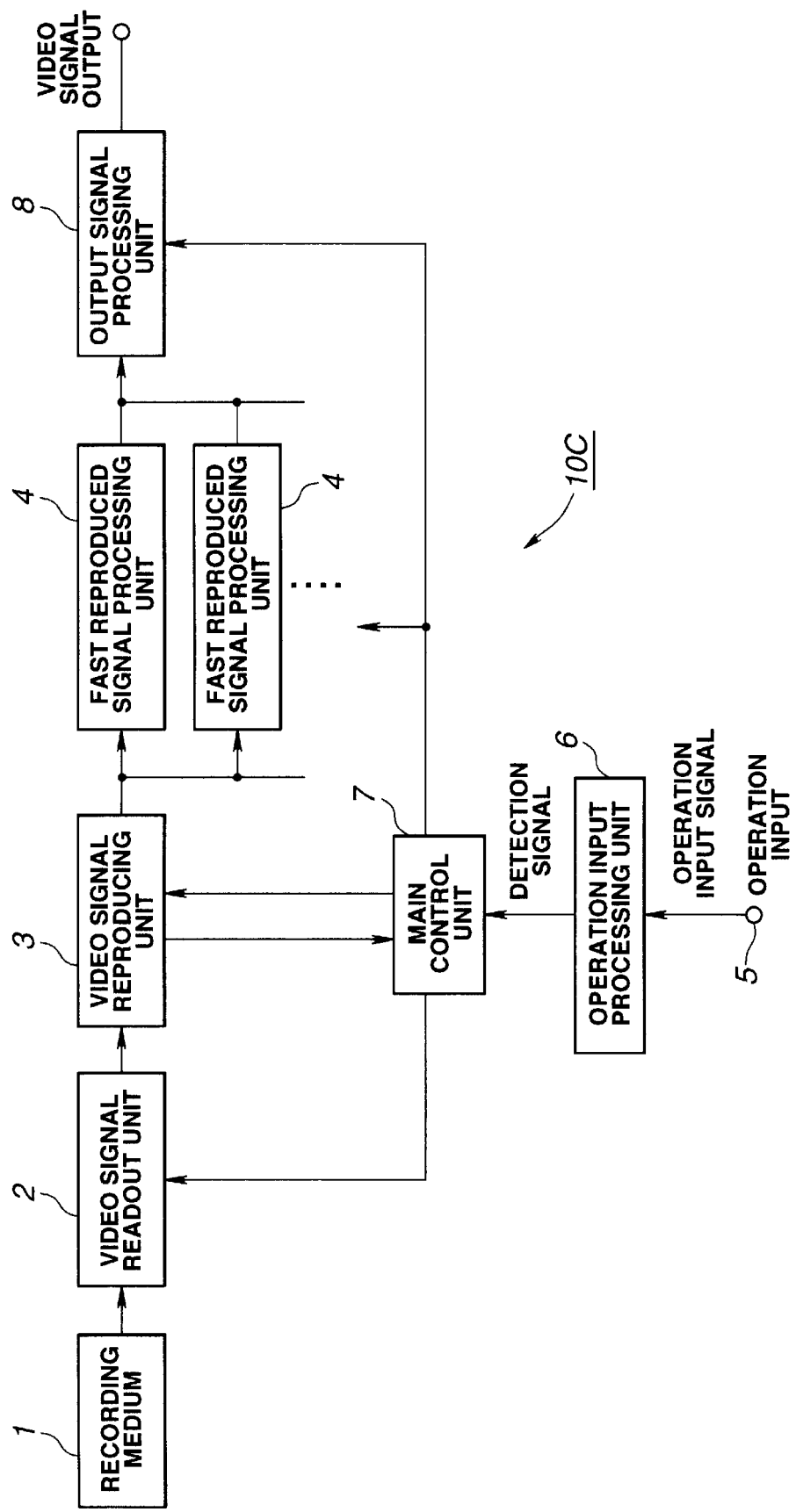
FIG. 10 is a block diagram showing an arrangement of an apparatus for reproducing a video signal according to a fourth embodiment of the present invention.

FIG. 10 shows a video signal reproducing apparatus according to a fourth embodiment of the present invention. The video signal reproducing apparatus 10C has the similar arrangement to the video signal reproducing apparatus shown in FIG. 1 except that plural fast reproduced signal processing units 4 are connected in parallel between the video signal reproducing unit 3 and the output signal processing unit 8.

In this video signal reproducing apparatus 10C, one fast reproduced signal processing unit 4 has a different synthesizing ratio and/or generating times of the middle pictures from another fast reproducing processing unit 4. Those fast reproduced signal processing units 4 are properly switched according to the reproduction speed of the video signal so that the video signals of the previous and the subsequent two frames intermittently reproduced from the video signal readout unit 2 may be supplied to the switched processing unit 4.

That is, the aforementioned video signal reproducing apparatuses 10, 10A and 10B are arranged to change the control amount of processing according to the reproduction speed, for facilitating the retrieval at the fast reproduction mode. Like the video signal reproducing apparatus 10C shown in FIG. 10, the connection of the fast reproduced signal processing units 4 in parallel is implemented so that those processing units 4 are properly switched according to the fast reproduction mode for doing the corresponding process. This arrangement makes it possible to facilitate the retrieval more.

Further, it goes without saying that the video signal reproducing apparatus 10C may have the detecting unit 9 and/or the additional information reproducing unit 20 like the foregoing video signal reproducing apparatuses 10A and 10B. This arrangement may offer the similar effect to the video signal reproducing apparatuses 10A and 10B.

The foregoing description has been concerned with the faster reproduction than the normal one. The similar process may be executed for the slow reproduction such as frame advance or slow motion. That is, at the fast reproduction mode, the generation and the insertion of the middle pictures are controlled about one picture per several frames, while at the slow reproduction mode, the similar processing method is executed so that the middle pictures of the originally consecutive frames may be generated.

According to the video signal reproducing apparatus according to the invention, as set forth above, the video signal readout unit and the video signal inserting unit of a synthesized picture are controlled according to the reproduction speed, for changing the reproduction speed as the signal is being reproduced. In this case, the corresponding video signals to the previous and the subsequent two frames reproduced by the means for reproducing the video signal are synthesized by the means for synthesizing the video signal. Then, the synthesized video signal inserting unit operates to insert the frame of the synthesized video signal between the previous and the subsequent two frames, so that the pictures with a small correlation therebetween read out of the video signal readout unit at the fast reproduction may be smoothly changed.

Hence, the video signal reproducing apparatus operates to sequentially reproduce the pictures with small correlation therebetween and alleviate the stress of a searcher caused by the abrupt change of the pictures. This makes it possible to improve the retrieval characteristic and reduce the fatigue and the discomfort caused at the retrieval time, thereby being able to magnifying the fast reproduction more.

The method for reproducing the video signal according to the present invention is executed to synthesize the video signals of the previous and the subsequent frames reproduced in series at the corresponding ratio to the reproduction speed and insert the frame of the synthesized video signal between the previous and the subsequent frames, thereby being able to smoothly change the pictures with small correlation between the adjacent ones read out at the fast reproduction mode.

The method for reproducing a video signal is thus executed to sequentially reproduce the pictures with small correlation between the adjacent ones, thereby being able to alleviate the stress of a searcher caused by the abrupt change between the adjacent pictures, improve the retrieval characteristic and reduce the fatigue and the discomfort at the retrieval time. If a faster reproduction mode is employed, no abrupt change between the pictures takes place and the fatigue and the discomfort at the retrieval time may be reduced.

What is claimed is:

1. An apparatus for reproducing a video signal comprising:
   means for reading a video signal from a recording medium according to a reproduction speed;
   means for generating a frame from said video signal;
   means for synthesizing two adjacent frames of a series of frames at a predetermined ratio to generate a synthesized frame; an
   means for inserting said synthesized frame between said two adjacent frames.

2. The apparatus for reproducing a video signal according to claim 1, wherein in case the reproduction speed is changed into a faster speed than a normal speed, said means for reading out a video signal is controlled to intermittently read out said video signal according to a reproduction speed magnification.

3. The apparatus for reproducing a video signal according to claim 1, wherein said synthesizing means comprises:
   storage means for storing one of the two adjacent frames, two multipliers being inputted at first inputs with said two frames through said storage means;
   an adder for synthesizing output signals from said multipliers; and
   a coefficient value generating unit for generating coefficient values of K and 1−K (0≦K≦1) for indicating said predetermined synthesizing ratio, one of said multipliers being inputted at a second input with said coefficient 1−K and the other of said multipliers being inputted at a second input with said coefficient K.

4. The video signal reproducing apparatus according to claim 1, wherein said synthesizing means synthesizes said two adjacent frames at different ratios for generating video signals of a synthesized picture of plural frames being different from one another.

5. The apparatus for reproducing a video signal according to claim 4, wherein said synthesizing means changes said different ratios so that a later one of the plural frames has a higher ratio of a later of the two adjacent frames.

6. The apparatus for reproducing a video signal according to claim 1, further comprising:
   means for detecting characteristics of said video signal; and
   means for controlling at least one of said synthesizing means and said inserting means according to the detected result of said detecting means.

7. The apparatus for reproducing a video signal according to claim 1, further comprising:
   means for reproducing additional information for the video signal recorded on said recording medium together with said video signal; and means for controlling at least one of said synthesizing means and said inserting means according to the reproduced additional information.

8. The apparatus for reproducing a video signal according to claim 1, further comprising:

two or more means for synthesizing a video signal at the corresponding ratio; and means for controlling the switch of the video signal of said previous and subsequent frames to a proper one of said synthesizing means.

9. The apparatus for reproducing a video signal according to claim 8, further comprising:

means for detecting characteristics of said video signal; and means for controlling the switch of said synthesizing means according to the detected result of said detecting means.

10. The apparatus for reproducing a video signal according to claim 8, further comprising:

means for reproducing additional information for said video signal recorded on said recording medium together with said video signal, and wherein said switch control means controls the switch according to the reproduced additional information.

11. A video signal reproduction method comprising the steps of:

reading a video signal from a recording medium according to a reproduction speed;

generating a frame from said video signal;

synthesizing two adjacent frames of a series of frames at a predetermined ratio to generate a synthesized video signal; and inserting a frame of said synthesized video signal between said two adjacent frames for a varied-speed reproduction.

12. A video signal reproduction method as claimed in claim 11, wherein said video signal is intermittently read out according to a reproduction ratio when carrying out said varied-speed reproduction for reproduction at a higher speed than a normal reproduction speed.

13. A video signal reproduction method as claimed in claim 11, wherein said synthesizing comprises the steps of:

storing video signals of the two adjacent frames;

reading the stored video signals;

multiplying one of the stored video signals by a coefficient K (0<K<1) indicating said predetermined ratio and the other stored video signal by a coefficient 1−K; and synthesizing the multiplied signals.

14. A video signal reproduction method as claimed in claim 11, wherein said two adjacent frames are each synthesized with a different respective ratio to generate synthesized video signals synthesized from different numbers of frames.

15. A video signal reproduction method as claimed in claim 14, wherein a temporally later-synthesized video signal has a higher ratio of a later video signal.

16. A video signal reproduction method as claimed in claim 11, wherein characteristics of the video signal are detected so that the video signals of said two adjacent frames are synthesized at a ratio according to a result of said detection.

17. A video signal reproduction method as claimed in claim 11, wherein said video signal is reproduced together with additional information for said video signal recorded on said recording medium; and said two adjacent frames are synthesized at a rate according to said reproduced additional information.

* * * * *